Dec. 7, 1965    R. JAGOUEIX    3,221,407
CHEESE MAKING APPARATUS
Filed Nov. 12, 1963    4 Sheets-Sheet 1
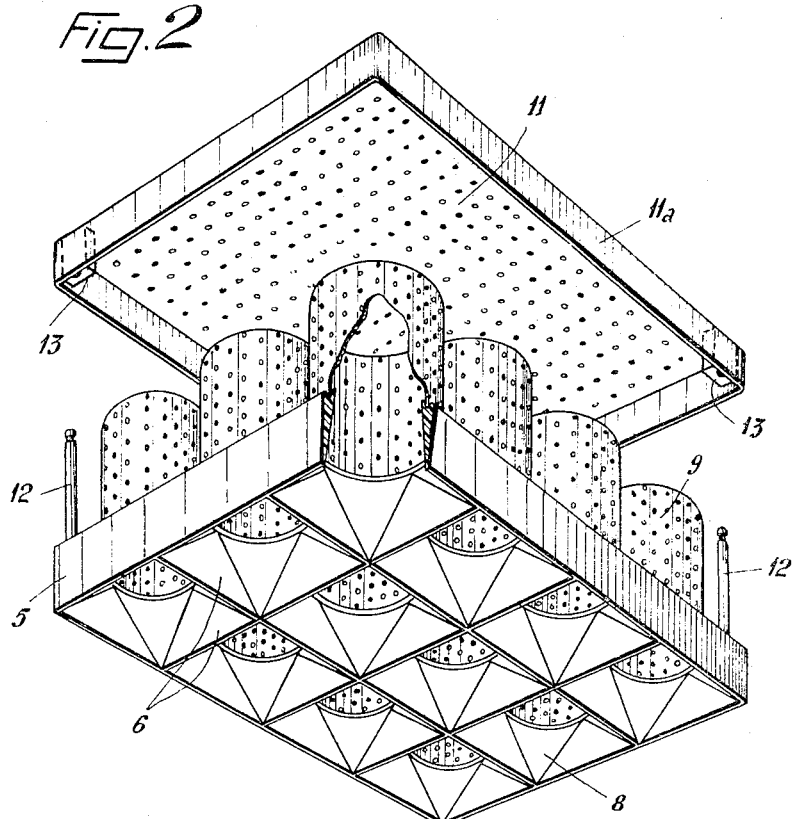
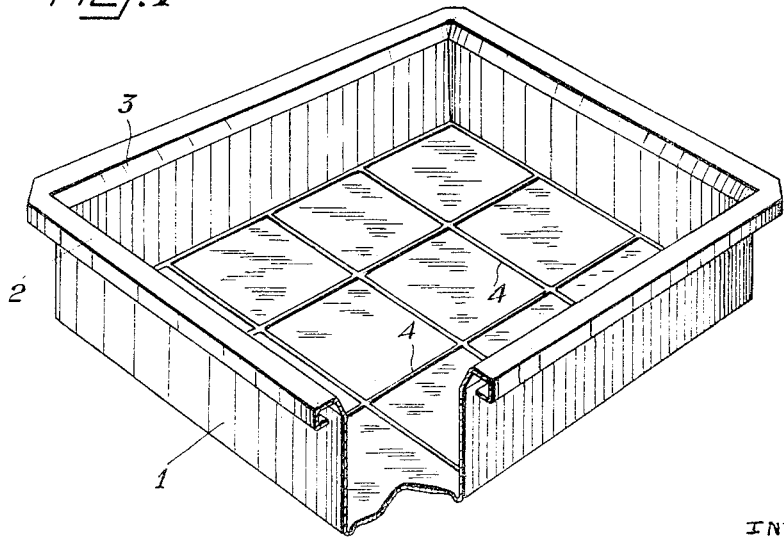
INVENTOR
ROBERT JAGOUEIX
By Stevens, Davis, Miller & Mosher
ATTORNEYS Dec. 7, 1965  R. JAGOUEIX  3,221,407
CHEESE MAKING APPARATUS
Filed Nov. 12, 1963  4 Sheets-Sheet 2
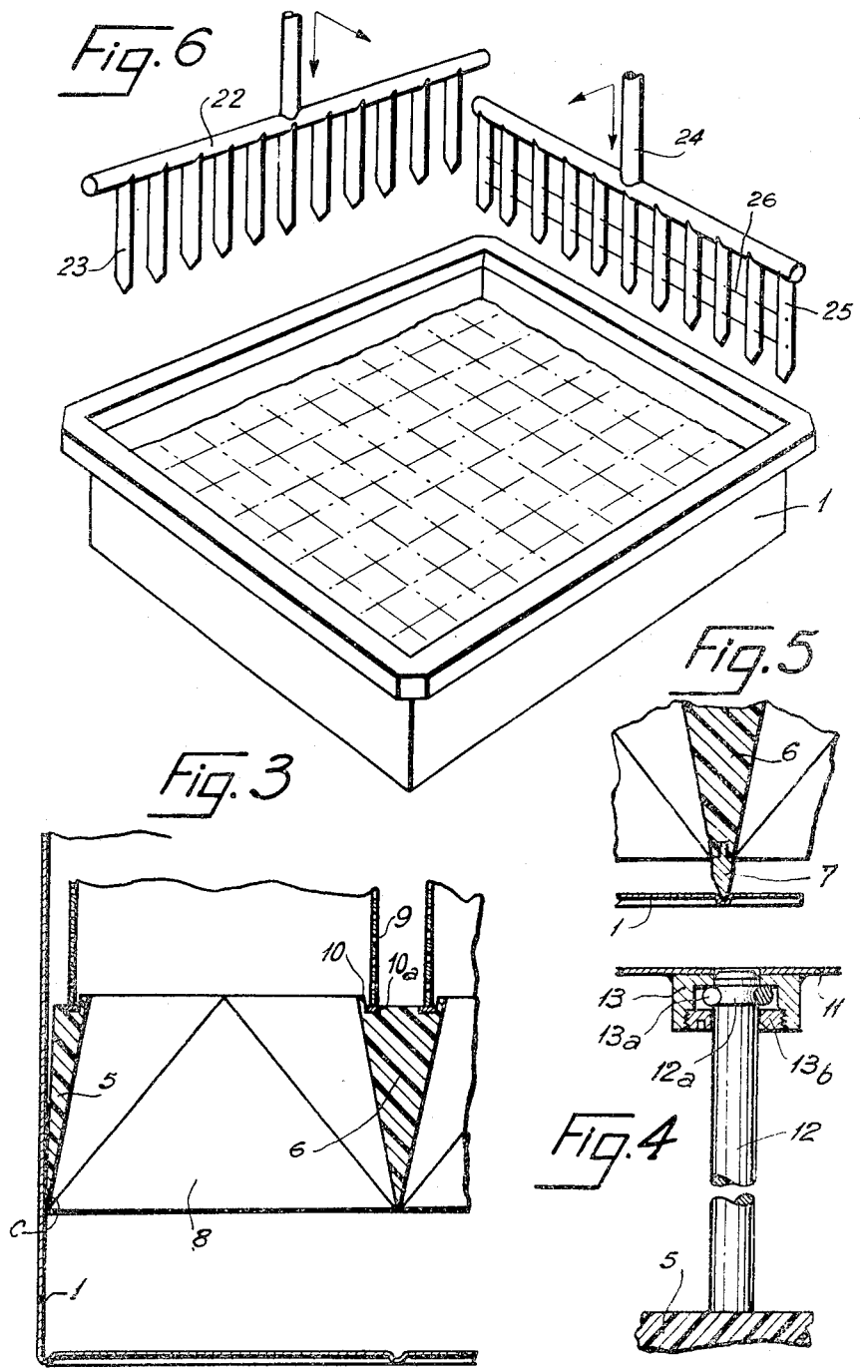
INVENTOR
ROBERT JAGOUEIX
By Stevens, Davis, Miller & Mosher
ATTORNEYS Dec. 7, 1965 R. JAGOUEIX 3,221,407
CHEESE MAKING APPARATUS
Filed Nov. 12, 1963 4 Sheets-Sheet 3
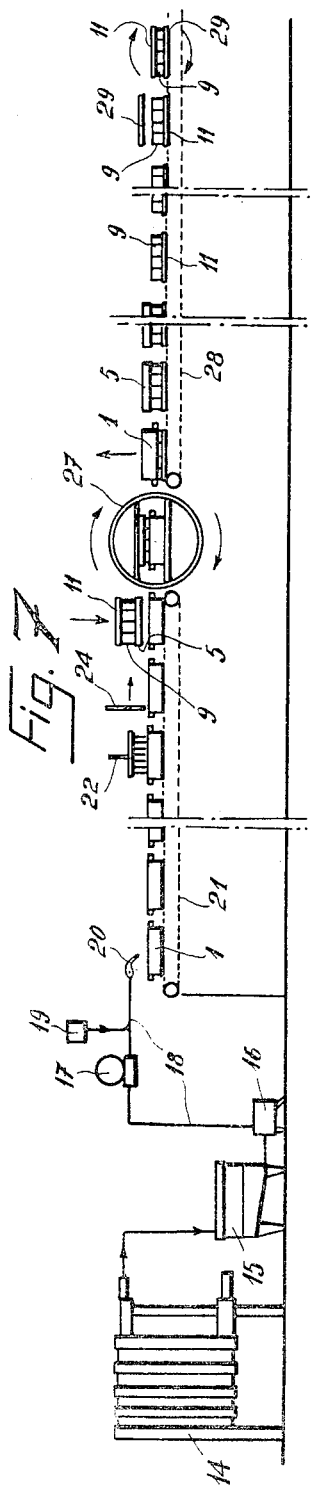
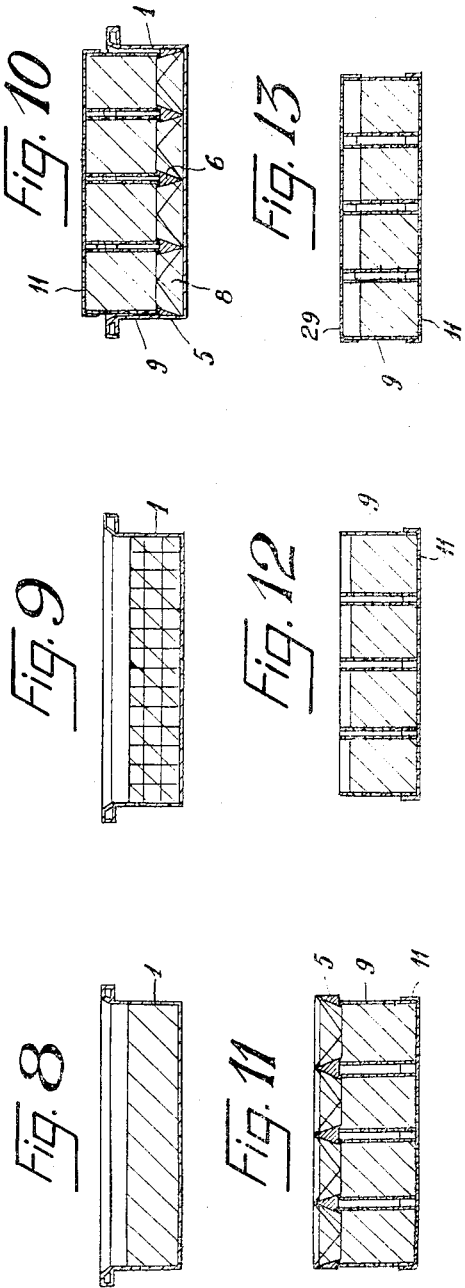
INVENTOR
ROBERT JAGOUEIX
By Stevens, Davis, Miller + Mosher
ATTORNEYS Dec. 7, 1965  R. JAGOUEIX  3,221,407
CHEESE MAKING APPARATUS
Filed Nov. 12, 1963  4 Sheets-Sheet 4
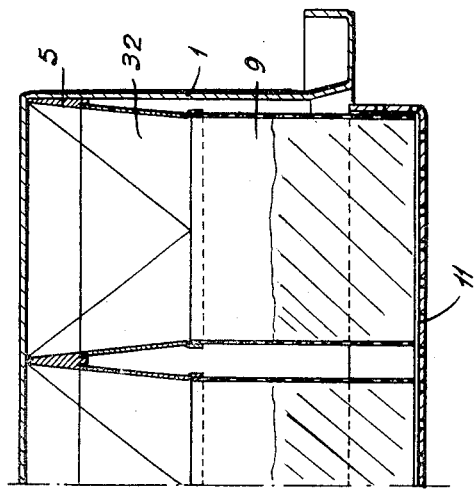
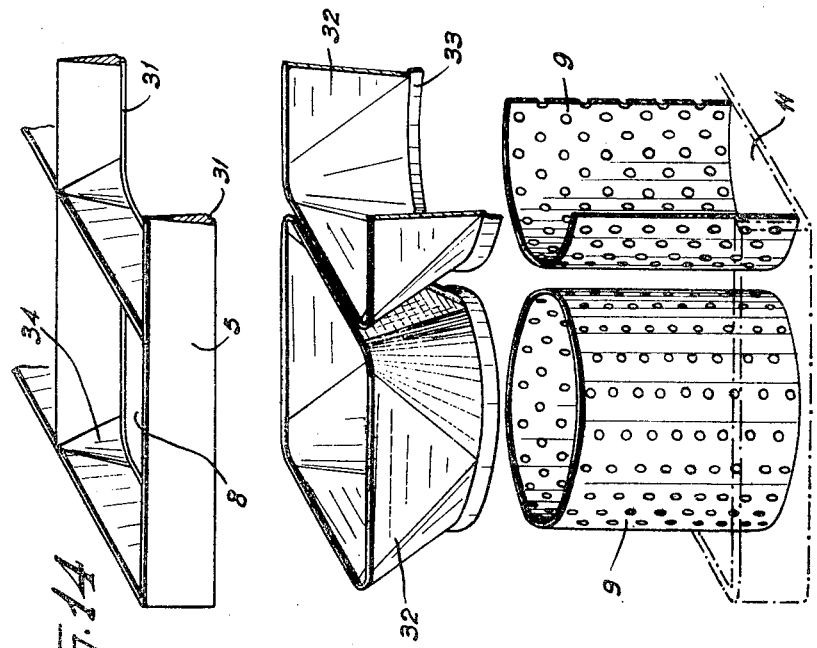
INVENTOR
ROBERT JAGOUEIX
By Stevens, Davis, Miller & Mosher
ATTORNEYS United States Patent Office
3,221,407
Patented Dec. 7, 1965

3,221,407
CHEESE MAKING APPARATUS
Robert Jagoueix, Deux-Sevres, France, assignor to Pierre Guerin S.A., Deux-Sevres, France, a company of France
Filed Nov. 12, 1963, Ser. No. 323,029
Claims priority, application France, Nov. 23, 1962, 916,449; May 6, 1963, 933,814
2 Claims. (Cl. 31—49)

This invention relates to the manufacture of cheeses more especiallly of the soft variety. A cheese making process generally comprises the steps of adding a curdling agent (e.g. rennet) to a body of milk, allowing the milk to curdle, molding the curd in molds or forms and draining the curd, followed by various final steps such as salting and others depending on the sort of cheese.

While various improvements have in recent years been introduced into the apparatus used in cheese-making plant it is found that none of the apparatus at present available is fully satisfactory in that the process employing such apparatus still involves a large number of relatively complicated handling operations which must generally be performed by hand, consuming a considerable amount of labor and time.

Objects of this invention include the provision of improved apparatus whereby the main steps involved in a cheese making process may be very quickly and simply carried out manually or mechanically with a minimum amount of handling, thus reducing labor requirements and increasing production while diminishing costs; the provision of cheese making apparatus which will be simple and economical to make, use and maintain, easy to clean, will produce cheeses of strictly uniform and homogeneous shape, size and composition; a subsidiary object deriving from this uniformity in composition especially in regard to the fatty content of the cheeses, is to facilitate accurate titration of the fatty content in the milk used as well as accurate metering of the amounts of milk (and curdling agent) to be used in order consistently to produce cheeses of a desired final quality in regard to their fatty and dry extract contents and the like. An important object is to provide cheese making plant which will be very well suited for mechanization and automation to any desired extent.

The invention will be fully understood from the ensuing description referring to preferred embodiments thereof selected by way of illustration but not of limitation and with reference to the accompanying drawings wherein:

FIGURE 1 is a perspective view, partly broken away, of a curdling tank or vat forming part of the improved apparatus.

FIGURE 2 is a perspective view partly broken away of a distributor frame structure forming part of the improved apparatus together with molds fitted thereon and a cover tray overlying the molds.

FIGURE 3 is a partial sectional view on an enlarged scale illustrating part of the tank of FIGURE 1, distributor structure and molds inserted into the tank, the view being taken on a vertical plane generally parallel to a side of the rectangular tank.

FIGURE 4 is a detail view on a further enlarged scale and mainly in section illustrating the interlocking arrangment provided for assembling the distributor frame structure and cover tray with each other and with the molds retained therebetween.

FIGURE 5 is a partial sectional view corresponding to a part of the structure shown in FIGURE 3 but in a somewhat modified form of said structure.

FIGURE 6 is a perspective view of a tank filled with curd positioned at a cutting-up station and with associated cutter devices provided at said station.

FIGURE 7 is a schematic view in side elevation of mechanized cheese-making plant according to a form of the invention.

FIGURES 8 to 13 are simplified sectional views of the apparatus shown in FIGURES 1–4 at various stages of the process performed in the plant of FIGUE 7.

FIGURE 14 is a partial exploded perspective view of distributor structure, molds and other parts according to a modified embodiment; and FIGURE 15 is a partial sectional elevation of the apparatus assembly according to the embodiment of FIGURE 14.

In the illustrated embodiment, referring especially to FIGURES 1–4, cheese making apparatus according to the invention includes a tank or vat 1 of rectangular or square form in plan with upstanding side walls having a flanged rim 2 for ease in handling and a flared entrance 3. The flat bottom of the vat is formed with a checker-pattern of grooves 4 defining a number of equal compartments, twelve in the illustrated example, each compartment serving to prepare one cheese.

The apparatus further comprises a distributor frame 5 (FIGURE 2) comprising a rectangular frame dimensioned to fit easily yet tightly into a vat or tank such as 1 and having separator partitions 6 defining a checker-pattern corresponding to the pattern of grooves 4 in the vat, so that the bottom edges of said frame and partitions will seat in the groove pattern of the vat. The distributor frame 5 is preferably made of a material having substantial flexibility and the rectangular peripheral wall thereof presents an outward taper or inclination (see FIGURE 3) and is so dimensioned with respect to the inner dimensions of vat 1 that on insertion of the distributor frame said peripheral wall will engage tightly with the inner wall surfaces of the vat thereby to scrape off any curd that might otherwise tend to cling to said wall surfaces. The lower edges of the peripheral wall of frame 5 and of the partitions 6 are tapered to a thin edge so as to cut into the curd and then seat into the grooves 4 in the bottom of the vat. According to a modified form of the invention, as shown in FIGURE 5, the bottom edges of the distributor frame walls may be fitted with separate edge inserts 7.

The apparatus further includes a number of molds 9 (FIGURE 2) into which the curd is to be poured from out of the vat 1 by way of the distributor frame 5 as later explained. In the illustrated example the moulds 9 are cylindrical with circular contours. Accordingly the sockets 8 defined between the partition walls of the distributor or guide frame 5 are shaped to provide a continuous transition from a rectangular shape at their lower ends adjacent the bottom of vat 1 to a circular shape at their upper ends where they mate with the molds 9. It will be understood however that the molds 9 may have any desired cross sectional shape, not necessarily circular, and may if desired be rectangular similar to the rectangular compartments defined in the bottom of vat 1 in which case the sockets 8 of the guide frame 5 may have a uniform rectangular cross section throughout their depth.

The molds 9 are positioned on the upper surface of the guide frame 5 around the upper end of each of the sockets 8. These upper ends of the sockets are provided with upstanding guide flanges or rims 10 (FIGURE 3) surrounded by annular grooves in the upper surface of guide frame 5 in which grooves seal strips 10a of suitable yielding material are receivable, preferably in a replaceable manner, and the lower ends of the molds 9 are adapted to seat in said grooves in engagement with such seals. An upper tray or cover 11 is adapted to overlie the tops of all the molds 9 to retain them in position, and is provided with a depending peripheral flange 11a. Both the molds 9 and cover tray 11 are perforate to permit draining the curd. Means are provided for locking the tray 11 in position over the guide frame 5 and such means may comprise rods 12 upstanding from the corners of the guide frame and provided with grooved heads at their upper ends adapted for insertion into sockets 13 provided at the corners of tray 11. Within each socket 13 there is provided a split ring 13a (see FIGURE 4) into which the groove in the head of the related rod 12 will snap on insertion. The split rings 13a are shown as being retained in position with retainer rings 13b threaded into a screw-threaded entrance of the socket 13.

Reference will now be had to FIGURE 7 illustrating a cheese making plant according to the invention. The plant is shown as including a milk supply unit 14 which may be arranged for pasteurizing the milk delivered thereto and/or heating such milk to a suitable curdling temperature. The heated milk from supply unit 14 is discharged to a buffer tank 15. A pumping unit 16 draws milk from the bottom of buffer tank 15 and discharges it through a rising pipe 18 terminating in a nozzle 20 overlying a suitable stand 21 shown as a conveyor of any appropriate form. The conveyor 21 receives a number of tanks 1 of the kind earlier described, to be positioned in turn beneath the outlet nozzle 20. The pipe 18 preferably has interposed therein a volume meter 17 provided with adjustable flow setting means. Beyond the meter 17 the pipe 18 has connected with it the outlet of a metering pump 19 for delivering thereto curdling agent (e.g. rennet or the like). The metering pump 19 may desirably be controlled in response to the rate of flow of milk delivered by milk pump 16, e.g. by way of a suitable servo-control from meter 17, so as to proportion the amount of curdling agent added to the milk flow. Thus each of the tanks 1 may receive a metered volume of milk containing a prescribed concentration of curdling agent therein. It will be understood that the arrangements just described are largely optional and that in a relatively small cheese making installation for instance the curdling agent may be added directly into the tanks for which purpose the tanks may be suitably provided with calibrated markings.

The tanks 1 are preferably carried in groups on suitable carriers placed on the conveyor table 21. After being filled with the milk and rennet mixture from nozzle 20 the tanks on each carrier are allowed to dwell on the conveyor, as at a suitable curdling station, for a sufficient time to allow the milk to curdle therein. FIGURE 8 illustrates a tank 1 containing a mass of curd therein as thus obtained.

The tanks 1 are then passed to a curd-cutup station comprising a cutter device 22 (also see FIGURE 6) provided with depending blades 23 and a further cutter device 24 disposed at right angles to cutter 22 and including in addition to the depending blades 25 a number of horizontal cutter blades or wires indicated at 26. The cutter devices 22 and 24 are operated in succession, each being first lowered down into the body of curd contained in a tank 1 and then drawn through the curd in a respective horizontal direction as indicated by the arrows in FIGURE 6, so as to cut up the body of curd into a plurality of cubes. The result of this stage of the process is illustrated in FIGURE 9.

The tanks are next passed to a molding station at which each tank 1 has inserted downwardly into it, a respective sub-assembly comprising a distributor frame 5, a set of molds 9 and a cover tray 11, in interlocked relation as earlier explained. As this sub-assembly is lowered into the tank 1 the outer walls of the guide frame sweep forcefully down the inner wall surfaces of the tank as earlier explained to scrape off the curd therefrom, and the partitions 6 subdivide the curd into equal portions all of identical composition, which are received in the respective sockets 8 and molds 9. This stage of the process is indicated in FIGURE 10.

The tanks are then fed over conveyor 21 to an upsetting station comprising a frame 27 rotatable about a horizontal transverse axis as indicated by the arcuate arrow, 180° at each operation, so that a curd-containing tank assembly positioned in said frame will be overturned or inverted to a position in which the assembly rests upon the tray 11. The tanks 1 are now removed.

From the upsetting station 27 the assemblies in overturned position, each now comprising a tray 11, molds 9 and guide frame 5 (see FIGURE 11), are passed to a further conveyor section 28 having a draining station in which the curd is subjected to a first draining step, with the aqueous constituent or whey draining out of the tank by way of the perforations in the molds 9 and tray 11. As a result the body of curd decreases in volume, and the portion of the curd previously positioned within the sockets 8 of the distributor frame 5 now settles completely in the molds 9. When this has occurred the guide frame 5 in turn is removed from each assembly, leaving only a tray 11 and a set of molds 9 thereon (FIGURE 12).

At a succeeding station on conveyor 28 a tray 29, similar to tray 11, is lowered over the tops of the molds 9 to provide an assembly as shown in FIGURE 13. Finally the assemblies are passed to a final draining station, indicated at the far right of FIGURE 7, where the assemblies are subjected to one or more overturning operations as indicated by the arrows to drain out residual water therefrom. This final overturning step, as well as all the previously described steps of the process, may be performed manually or mechanically, e.g. by means of an upsetting frame similar to frame 27. Prior to the last one of these overturning steps, the cover tray 11 or 29 positioned on top of the assembly is removed and replaced with a suitable screen, the assembly is overturned one last time to position the screen underneath, and the molds 9 are removed.

The fresh molded cheese now positioned on the screens is subjected to any final processing steps in a conventional manner, including salting, aging, and the like. It will be understood that the plant includes a suitable number of tanks 1, guide frames 5, sets of molds 9, and trays 11 (or 29) and other equipment to permit continuous processing, with the various components of the equipment on being discharged from the process being continuously passed to a cleaning and drying station and returned to the input end of the plant in continuous rotation.

Any suitable number of molds 9 may be used per tank and their shape may be varied as desired, depending on the size of the plant and the type of cheese being made. The invention is applicable to all kinds of cheese including especially soft cheeses, washed-, cooked- or semi-cooked pulp cheeses, and the like, made from any kind of milk.

The modification of the invention illustrated in FIGURES 14 and 15 is generally similar to the embodiment described above with reference to FIGURES 1–5, and again includes a tank 1 (see FIGURE 15), a guide frame structure 5, cylindrical molds 9 and a cover tray 11. In this case however, the guide frame 5 is of shallower depth than in the first case with respect to the depth of the molds, and there is provided an additional component in the form of a set of intermediate connecting or extension members 32, having their one ends, of substantially square shape, engageable with the ends of the respective sockets defined in the guide frame 31 and their opposite, circular, ends engageable with the ends of the molds 9. The walls and partitions of the guide frame 5 are formed with rebates 31 for the seating of said one ends of the intermediate members 32, and the other ends of members 32 are flanged as at 33 for engagement with the molds 9, It will be noted that in this case as in the first embodiment the molds 9 are of circular cross section, but this again is a matter of choice. To improve the gradual merging from the square to the circular shape the sockets 8 in the guide frame 5 are provided at their four corners with part-conical segments or inserts 34 having their points directed towards the end of the socket 8 which is to seat in the grooves of tank 1, so that the opposite ends of said sockets are in the form of squares with rounded corners, and the same is true of the mating ends of the intermediate members 32.

The manner of application of this embodiment of the improved apparatus to a process of the general type described with reference to FIGURES 6–13 is the same as that described for the first embodiment. The intermediate connector members 32 are left in engagement with the molds 9 until after the overturning stage shown in FIGURE 11, after which they are removed together with the tank 1 and frame 5, after the curd has fully settled within the molds 9. The molds may hence be made shallower, facilitating the final overturning step and reducing the risk of damage to the cheese.

It will be apparent that various changes and modifications may be made in the embodiments of the invention illustrated and described without exceeding the scope of the invention, both as concerns the shape, dimensioning and construction of the various components of the molding apparatus, and the components of the cheese-making plant disclosed as utilizing such apparatus. The invention considerably facilitates the various steps of a cheese making process, increases output and renders the process as a whole more readily amenable to automation to the extent this may be desired.

What I claim is:

1. Cheese making apparatus comprising in combination a plurality of assemblies each comprising a flat-bottomed tank, a distributor structure having an outer frame engageable with side surfaces of the tank and having means defining a number of open-ended sockets with their one ends engageable with the tank bottom, molds removably connectable with the opposite ends of said sockets and having perforate sides, a perforate tray removably fittable over the opposite ends of said molds; conveyor means adapted to receive a plurality of said tanks; a feeding station adjacent said conveyor for filling said tanks with milk and curdling agent in metered amounts; a curdling station following said feeding station, a cutting station following the curdling station comprising means for cutting up the curd in the tanks; an assembly station following the cutting station for fitting said distributor structure, molds and tray over the curd in the tanks; an overturning station following the assembling station for inverting the interfitted assemblies; and further stations following the overturning station comprising means for removing said tanks and structures from the inverted assemblies to enable the curds in the molds to drain.

2. In a cheese-making apparatus, a curd-preparing and molding assembly comprising in combination a tank adapted to receive a body of milk composition to be curdled therein, said tank being flat-bottomed with grooves therein and having upstanding side walls, said walls at their free ends having a flanged rim and a flared inner edge, a distributor frame structure having an outer peripheral frame removably engageable with the side wall surfaces of said tank and having intercrossed partition means therein defining a number of flare open-ended sockets, said flare ends being engageable with the grooves in the bottom of the tank to divide said body into portions, said upstanding walls and said peripheral frame being made of resilient material, the side walls of said peripheral frame having outwardly tapered edges adapted to fit within said upstanding walls in a yielding, frictional engaging, scraping relation therewith, and molds removably connectable to the other ends of the respective frame sockets whereby inversion of the assembly will fill all the molds with curd from the tank.

References Cited by the Examiner

FOREIGN PATENTS 90,378    2/1961    Denmark.
1,159,332    6/1958    France.

SAMUEL KOREN, *Primary Examiner.*

HUGH R. CHAMBLEE, *Examiner.*